United States Patent
Sun et al.

(10) Patent No.: US 7,683,825 B2
(45) Date of Patent: Mar. 23, 2010

(54) METHOD AND APPARATUS FOR MEASURING DISTANCE BETWEEN A TARGET AND A RECEIVER IN A RANGING SYSTEM

(75) Inventors: Xiaobing Sun, Singapore (SG); Yugang Ma, Singapore (SG); Jin Xu, Singapore (SG); Kanzo Okada, Singapore (SG)

(73) Assignee: Sony Corporation (JP)

( * ) Notice: Subject to any disclaimer, the term of this patent is extended or adjusted under 35 U.S.C. 154(b) by 110 days.

(21) Appl. No.: 11/810,132

(22) Filed: Jun. 4, 2007

(65) Prior Publication Data

US 2008/0024355 A1    Jan. 31, 2008

(30) Foreign Application Priority Data

Jun. 6, 2006 (SG) .............................. 200603811-1

(51) Int. Cl.
  *G01S 13/08* (2006.01)
(52) U.S. Cl. ...................... 342/118; 342/135; 342/137; 342/139; 342/146
(58) Field of Classification Search ................... 342/85, 342/88, 118, 135, 137, 139, 146
  See application file for complete search history.

(56) References Cited

U.S. PATENT DOCUMENTS

| | | | | |
|---|---|---|---|---|
| 3,503,680 A | * | 3/1970 | Stanley | 356/5.08 |
| 4,559,607 A | * | 12/1985 | Lu | 708/422 |
| 4,564,918 A | * | 1/1986 | McNally et al. | 702/79 |
| 4,905,009 A | * | 2/1990 | Ulich et al. | 342/118 |
| 5,058,200 A | * | 10/1991 | Huang et al. | 455/456.2 |
| 5,285,209 A | * | 2/1994 | Sharpin et al. | 342/424 |
| 5,510,800 A | * | 4/1996 | McEwan | 342/387 |
| 5,661,490 A | * | 8/1997 | McEwan | 342/387 |
| 5,977,958 A | * | 11/1999 | Baron et al. | 345/179 |
| 6,094,627 A | * | 7/2000 | Peck et al. | 702/199 |
| 6,122,602 A | * | 9/2000 | Michalski et al. | 702/159 |
| 6,360,078 B1 | * | 3/2002 | Driedger et al. | 455/67.16 |
| 6,535,161 B1 | * | 3/2003 | McEwan | 342/124 |
| 6,587,187 B2 | * | 7/2003 | Watanabe et al. | 356/5.01 |
| 6,703,570 B1 | * | 3/2004 | Russell et al. | 178/19.03 |
| 6,795,019 B2 | * | 9/2004 | Holt | 342/453 |

* cited by examiner

*Primary Examiner*—Thomas H Tarcza
*Assistant Examiner*—Peter M Bythrow
(74) *Attorney, Agent, or Firm*—Lerner, David, Littenberg, Krumholz & Mentlik, LLP

(57) ABSTRACT

A method of measuring distance between a target and a receiver in a ranging system may comprise transmitting a first pulse at a first time determined by a sampling clock in a receiver, receiving the first pulse, sampling the first pulse at a predetermined amplitude threshold using the sampling clock and determining the time of arrival of the first pulse in terms of a number of periods of the sampling clock after the first pulse was transmitted. This may be repeated for a second pulse and the average times of arrival of the first and second pulses are determined to obtain an averaged estimated time of arrival. The distance between the target and the receiver may be determined by multiplying the averaged estimated time of arrival by the speed of propagation of the transmitted pulses. There is also disclosed an apparatus for measuring distance.

8 Claims, 4 Drawing Sheets

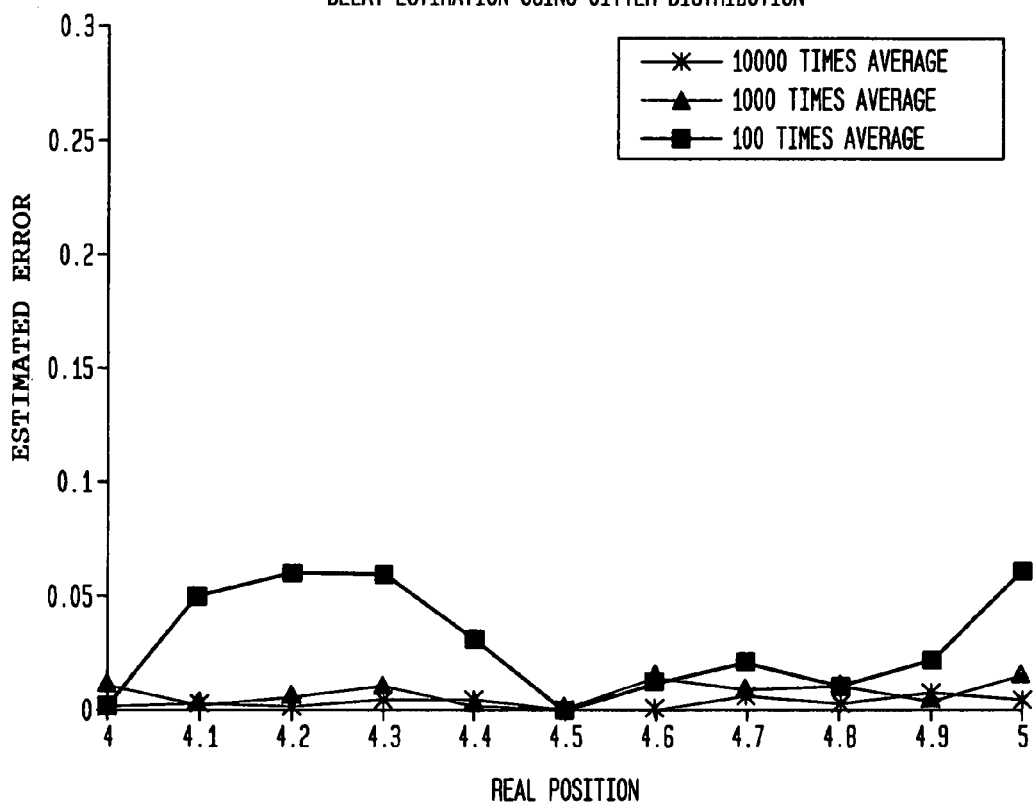
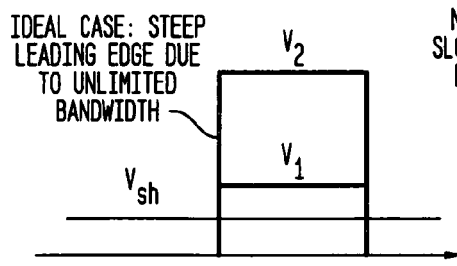
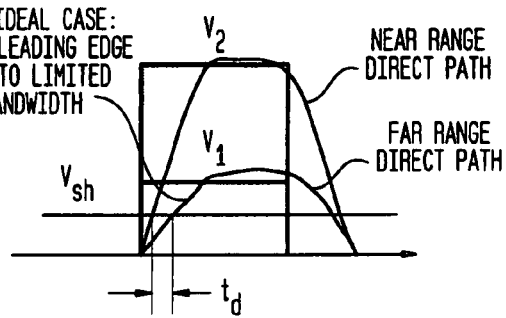

METHOD AND APPARATUS FOR MEASURING DISTANCE BETWEEN A TARGET AND A RECEIVER IN A RANGING SYSTEM

CROSS-REFERENCE TO RELATED APPLICATIONS

This application claims priority from Singapore Patent Application No. SG 200603811-1 filed in the Singapore Patent Office on Jun. 6, 2006, the entire content of which is incorporated herein by reference.

FIELD OF THE INVENTION

The present invention relates to method of measuring distance between a target and a receiver in a ranging system, and to an apparatus for measuring distance between a target and a receiver.

BACKGROUND OF THE INVENTION

The measurement of the distance between two objects has wide application in fields such as radar systems, indoor/outdoor positioning systems, robot systems, collision avoidance, game playing, and smart home/office arrangements. The distance measurement may be made by measuring the time-of-flight of wave propagation in air (or in another media) such as electromagnetic, light or sound waves. Multiplying the time-of-flight by the speed of the wave propagation enables the distance to be determined. The accuracy of such a distance measurement is therefore dependent on the measurement accuracy of the time-of-arrival (hereinafter referred to as TOA) or the time-difference-of-arrival (TDOA) of the incoming signal.

In a modern conventional ranging system, the incoming signal waveform is normally first sampled in the time domain before the TOA is measured. Although the true TOA is a continuous value, the TOA in a discrete system may only conventionally be estimated based on an integral number of sampling intervals $t_s$. If the incoming time of a signal falls between two successive samples, in a simple ranging system the signal may be estimated as either coming at a first sampling time or a second sampling time, or in the middle of the two sampling times. Therefore, the final range estimation error is determined by the size of the sampling step. The ranging accuracy may be improved by increasing the sampling rate (that is, by shortening the sampling step). However, this increases the hardware complexity, as well as the cost and power consumption of the system.

The range between two objects may be measured in many different ways. Conventionally, determining the TOA of electromagnetic, sound and optical waves propagating in air is a common way to measure the distance between objects. As mentioned above, the accuracy of the TOA measurement will determine the accuracy of the final range (distance) measurement. For example, in an RF range measurement system, if the TOA error is 1 ns, the corresponding range error will be 0.30 m.

In many systems, to measure the range accurately, the arrival time of the leading edge of an incoming signal waveform needs to be accurately determined. In a discrete sampling based system, the estimation error of the leading edge is strongly dependent on the sampling step, that is, the time between samples. If the sampling step is reduced, the error will be reduced accordingly. The publication Time Domain Corporation, "PulsON 210™ Reference Design Training", September, 2005 discloses an ultra wideband (UWB) ranging system based on such a method. However, in the described system, a high sampling rate is used which requires an accurate timing system and very high speed circuit implementation.

To detect accurately the leading edge of a waveform, a method is proposed in U.S. Pat. No. 5,977,958 which suggests the use of a high speed multibit analogue-to-digital (AD) sampling method. The slope of the leading edge of a waveform may be obtained from multiple samples of the incoming waveform and the exact threshold-passing time may be calculated. The TOA estimation may be obtained in sub-sampling step accuracy. However, this method requires the speed of the analogue-to-digital converter to be high enough for several samples to be taken in the signal's leading edge and, at the same time, the analogue-to-digital converter requires multibit resolution.

U.S. Pat. No. 6,587,187 B2 discloses a way of using multiple clocks to sample a waveform and find the leading edge thereof. A coarse clock and a fine clock are described. However, the timing system in this method is quite complex.

The above-mentioned conventional methods appear to require complex circuit implementation and the systems to work at a high clock rate. This results in high costs and high power consumption.

Thus there is a need for a system and method which is simple to implement and low in cost and power consumption.

SUMMARY OF THE INVENTION

In broad terms, the present invention may provide an apparatus and method of measuring distance between a target and a receiver by controlling the timing of a transmitted pulse relative to a sampling clock to adjust the timing relationship between sampling pulses and a received pulse to determine the time of arrival of the received pulse from which the distance may be calculated knowing the speed of propagation of the transmitted pulse.

According to a first aspect of the present invention there is provided a method of measuring distance between a target and a receiver in a ranging system, the method may comprise transmitting a first pulse at a first time determined by a sampling clock in a receiver; receiving the first pulse; sampling the received first pulse at a predetermined amplitude threshold using the sampling clock; determining the time of arrival of the received first pulse in terms of a number of periods of the sampling clock after the first pulse was transmitted; transmitting a second pulse at a second time determined by the sampling clock; receiving the second pulse; sampling the received second pulse at a predetermined amplitude threshold using the sampling clock; determining the time of arrival of the received second pulse in terms of a number of periods of the sampling clock after the second pulse was transmitted; determining the average times of arrival of the first and second pulses to obtain an averaged estimated time of arrival; and determining the distance between the target and the receiver by multiplying the averaged estimated time of arrival by the speed of propagation of the transmitted pulses.

This method is particularly advantageous as it is simple and may reduce the range estimation error by at least fifty percent.

Preferably, the method may further comprise repeating the steps for a predetermined number of pulses; wherein the step of determining the averaged time of arrival may comprise determining the averaged time of arrival for the predetermined number of pulses.

Preferably, the step of transmitting the first pulse may comprise transmitting the first pulse coincident with a sampling clock pulse generated by the sampling clock, and the step of transmitting the second pulse may comprise transmitting the second pulse at a time corresponding to half a sampling clock period prior to a predetermined sampling clock pulse.

In a preferred embodiment, the sampling clock may have an associated jitter, the method may further comprise controlling the jitter to vary the time of arrival of one or more pulses as measured by the sampling clock, and wherein the step of determining the averaged time of arrival may comprise averaging the times of arrival of a predetermined number of pulses.

In this preferred embodiment, clock jitter may be used to increase the reduction in the ranging error by averaging among multiple measurements. Controlling the clock jitter distribution may assist in reducing the error with a limited predetermined number of averages. Therefore, instead of considering that jitter has a bad effect on TOA measurement, a specific controllable jitter may assist in improving the measurement.

Preferably, the method may further comprise scaling the determined distance by a scaling factor to allow for amplitude variation in the received signal over distance and provide a corrected distance measurement. If constant amplifier gain is used for all range signals, this may be according to the equation:

$$r_{real} = \frac{r_{meas}}{1+k_m}; \text{ where } k_m = \frac{cV_{sh}}{2.5BV_{ref}r_{ref}}$$

and where $r_{real}$ is the corrected distance measurement, $r_{meas}$ is the determined distance, c is a constant representing the speed of light $V_{sh}$ is a predetermined threshold voltage, $V_{ref}$ is a voltage amplitude of the received pulses at a predetermined distance, $r_{ref}$ is the predetermined distance, and B is the bandwidth of the receiver.

According to a second aspect of the invention there is provided an apparatus for measuring distance between a target and a receiver, the apparatus may comprise a transmitter for transmitting a first pulse at a first time determined by a sampling clock; a receiver for receiving the first pulse; the receiver including the sampling clock; a sampling stage for sampling the received first pulse at a predetermined amplitude threshold using the sampling clock; means for determining the time of arrival of the received first pulse in terms of a number of periods of the sampling clock after the first pulse was transmitted; the transmitter being arranged to transmit a second pulse at a second time determined by the sampling clock; the receiver being arranged to receive the second pulse; the sampling stage being arranged to sample the received second pulse at a predetermined amplitude threshold using the sampling clock; the means for determining being arranged to determine the time of arrival of the received second pulse in terms of a number of periods of the sampling clock after the second pulse was transmitted; the apparatus may further comprise an averaging stage arranged to determine the average times of arrival of the first and second pulses to obtain an averaged estimated time of arrival; and a distance determination stage for determining the distance between the target and the receiver by multiplying the averaged estimated time of arrival by the speed of propagation of the transmitted pulses.

Preferably, the means for averaging may be arranged to average the time of arrival of a predetermined number of pulses.

Preferably, the transmitter may be arranged to transmit the first pulse coincident with a sampling clock pulse generated by the sampling clock, and may be arranged to transmit the second pulse at a time corresponding to half a sampling clock period prior to a predetermined sampling clock pulse.

In a preferred embodiment, the sampling clock may have an associated jitter, the system may further comprise control means for controlling the jitter to vary the time of arrival of one or more pulses as measured by the sampling clock, and wherein the means for averaging may be arranged to average the times of arrival of a predetermined number of pulses.

Preferably, the apparatus may further comprise a scaling stage for scaling the determined distance by a scaling factor to allow for amplitude variation in the received signal over distance and provide a corrected distance measurement. If constant amplifier gain is used for all range signals, this may be according to the equation:

$$r_{real} = \frac{r_{meas}}{1+k_m}; \text{ where } k_m = \frac{cV_{sh}}{2.5BV_{ref}r_{ref}}$$

and where $r_{real}$ is the corrected distance measurement, $r_{meas}$ is the determined distance, c is a constant $V_{sh}$ is a predetermined threshold voltage, $V_{ref}$ is a voltage amplitude of the received pulses at a predetermined distance, $r_{ref}$ is the predetermined distance, and B is the bandwidth of the receiver.

By using a specific relationship between the transmitting pulse time and the sampling time, or by selecting appropriate clock jitter distribution and using an average over multiple measurements, the range accuracy of a ranging system may be improved.

For a frequency bandwidth limited system, if a fixed threshold is used to detect the leading edge of the incoming signal, a proper range scaling factor may be used to correct the range bias for a long range signal.

Preferred embodiments may be used to improve the ranging accuracy of a simple ranging system. The methods are simple in implementation and thus may be used to build a system with low cost, low power consumption and good ranging accuracy.

BRIEF DESCRIPTION OF THE DRAWINGS

The present invention will now be described by way of example and with reference to the accompanying drawings in which:

FIG. 5 is a graph showing the simulated time measurement error against actual timing for a number of different averaging times, the clock jitter distribution being assumed to be uniformly distributed in range $[-t_s/2, t_s/2]$;

FIG. 6(a) is a waveform showing the idealized received pulse for short and long range paths;

FIG. 6(b) is a series of practical waveforms due to limited bandwidth of a receiver system.

DETAILED DESCRIPTION

Figure 1:
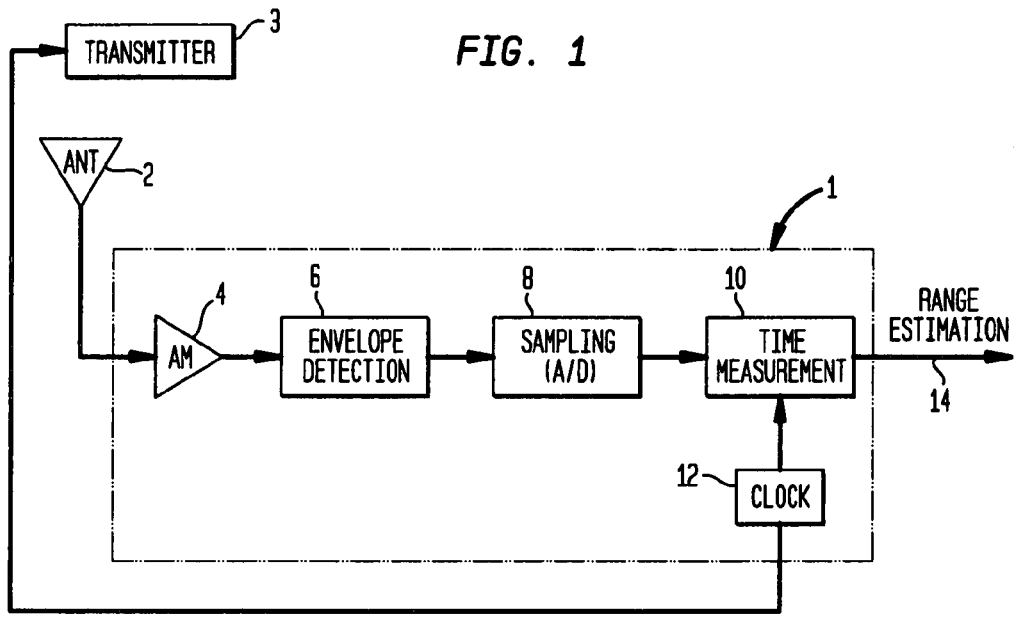
FIG. 1 is a block diagram of a transmitter and a receiver section of a range measuring system for use in an embodiment of the present invention.

FIG. 1 shows a block diagram of a receiver 1 for a general ranging system. An antenna 2 receives an incoming signal from a transmitter 3 and this is forwarded to an amplifier stage 4 where the signal is amplified. The amplified signal is passed to an envelope detection stage 6 and the output of this stage is sampled and converted into digital format in a sampling and analogue-to-digital converter stage 8. In the simplest case, the analogue-to-digital converter need only be 1-bit which may be implemented simply by comparing the signal amplitude with a fixed threshold. The output from the sampling and analogue-to-digital converter stage 8 is a digital waveform which may be further processed in a time measurement stage 10 which is driven by a clock 12. The estimated time of arrival of the incoming waveform may be passed to a range estimation stage 14 to determine the distance of the transmitter from the receiver.

Figure 2A:
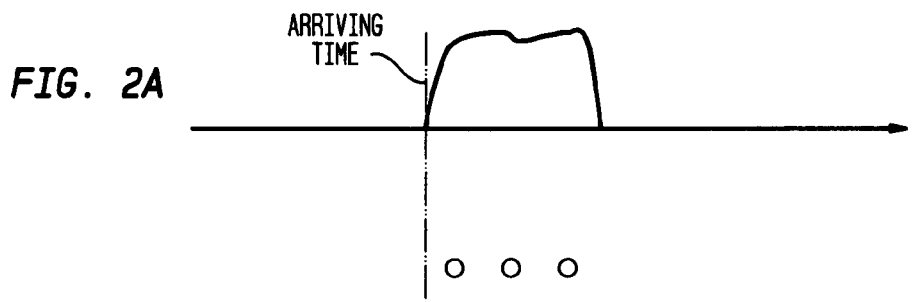
FIG. 2(a) is a waveform of a received signal after envelope detection in the range measuring system of FIG. 1.
Figure 2B:
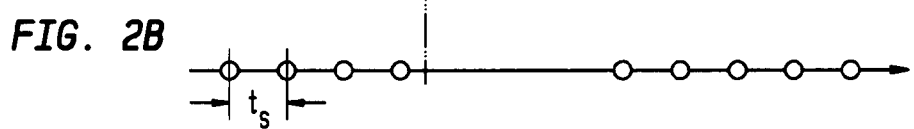
FIG. 2(b) is a waveform of a received signal after sampling of the analog waveform in a range measuring system according to a preferred embodiment of the present invention, where it is assumed that 1-bit AD converter is used.

FIG. 2(a) shows an example of a typical envelope waveform of an incoming signal before sampling. FIG. 2(b) shows the waveform of FIG. 2(a) after sampling and digitizing using a 1-bit AD converter. The sampling step is denoted by $t_s$. The TOA may be estimated from this discrete waveform shown in FIG. 2(b). If, for example, the signal arrives between sampling times 4 and 5, as shown in FIG. 2(b), the digital value (1-bit AD output) at time 4 is '0' and at time 5 is '1'. Therefore, it is only possible to determine that the TOA is between sampling times 4 and 5, but it is not possible to determine the exact TOA. One estimation would be to assume that the TOA is 4.5. However, as the true arrival time may be anywhere between sampling times 4 and 5, there will be a time estimation error associated with such an estimation.

Figure 2C:
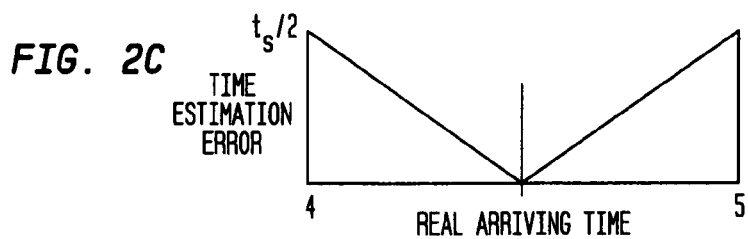
FIG. 2(c) is a graph showing the variation in time estimation error with the arrival time of the waveform of FIG. 2(a) using a fixed sampling interval $t_s$.

FIG. 2(c) shows the TOA estimation error plotted against the true TOA for a given waveform. It will be seen that the maximum TOA estimation error is $t_s/2$. The error may be reduced by reducing the sampling step $t_s$. However, this is a high cost solution as the circuit would need to work at a higher clock rate and the system would have high power consumption.

Figure 3A:
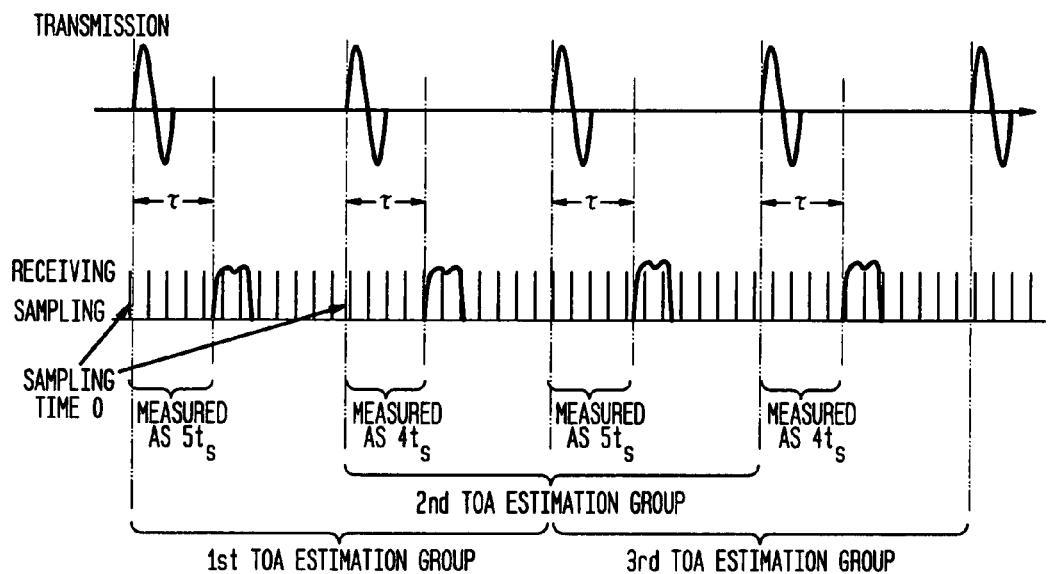
FIG. 3(a) is a representation of several waveforms showing the effect of a specific relationship between the pulse transmitting time and sampling time according to an embodiment of the invention.

A first preferred embodiment of the present invention is shown in FIG. 3(a). In the time measurement stage 10 of a pulse based range measurement system 1 such as that shown in FIG. 1, the transmitting pulse times are alternately aligned with a range measurement sampling time 0 and a sampling time −0.5. The leading edges of the received signals may fall between different sampling times for different transmitting pulses. Where the leading edge will fall will depend on the true delay τ. Therefore, by measuring the times of arrival for two successive pulses, it is possible to make a better estimation of the time of arrival of the waveform. To illustrate this, a number of numerical examples are given in below. The values are all normalized to $t_s$.

| Real TOA | Measured TOA for pulse aligned with sampling time 0 | Measured TOA for pulse aligned with sampling time −0.5 | Best estimated TOA based on two measurements |
|---|---|---|---|
| 4.5 | 5 | 4 | 4.25 |
| 4.2 | 5 | 4 | 4.25 |
| 4.6 | 5 | 5 | 4.75 |
| 4.7 | 5 | 5 | 4.75 |

Figure 3B:
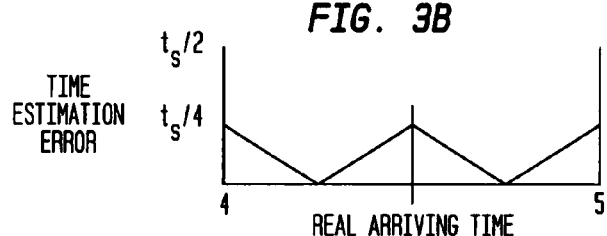
FIG. 3(b) is a graph showing the distribution of time estimation error using a system according to an embodiment of the present invention.

By grouping the TOA estimations in two successive periods, as shown in FIG. 3(a), the TOA estimation error may be reduced by half as compared with FIG. 2. Thus, in this preferred embodiment, alternate transmission pulses may be displaced by half a sampling step $t_s$ and this change to the design and range estimation method may reduce the range error by a half compared to that shown in FIG. 2. As shown in FIG. 3(b), which shows the variation in measuring error with the true TOA, the maximum error is reduced to $t_s/4$.

In a further preferred embodiment of the present invention, instead of using a controlled relationship between pulse transmitting time and sampling time, the relationship may be changed naturally by practical clock jitter. Normally the pulse transmitting time is determined by counting a clock, and, as there is always existing jitter for any clock, this jitter will cause the transmitting time to vary. Furthermore, the sampling clock itself also has its jitter. As these clock jitters are relative changes, to simplify the analysis, the two clock jitters may be added together and assigned to the sampling clock jitter, that is, it may be assumed that the pulse transmitting clock has no jitter at all and the sampling clock jitter has a jitter equivalent to the summed result of the two clock jitters. As in the first described preferred embodiment above, this jitter will cause the leading edge positions to change in different measuring periods when measured by the sampling clock. As the clock jitter is a random variable, measurements over a number of periods may be used and the results averaged to obtain the TOA.

Figure 4A:
FIG. 4(a) is a waveform of the received signal after envelope detection using the natural clock jitter to measure the leading edge of an arriving signal and using averaging to reduce the time estimation error.

FIG. 4(a) shows a waveform of the received signal after envelope detection using the natural clock jitter to measure the leading edge of the arriving signal and using an averaging calculation to reduce the time estimation error. Assuming the clock jitter is uniformly distributed in the range $[-t_s/2, t_s/2]$, as shown in FIG. (4b), the leading edge measured using this jittered clock will be varied accordingly. By averaging the measurement results a number of times, the TOA estimation may be greatly improved. Some numerical examples are shown in below. If the averaging time is great enough, the TOA estimation error will reduced to 0 according to the laws of probability.

| | Real Delay | Measured TOA Distribution Due to Clock Jitter | Assumed Measured TOA | Weighted Averaged Results |
|---|---|---|---|---|
| Case 1 | 4.25 | 25% chances = 4, 75% chances = 5 | 25% chances = 3.5, 75% chances = 4.5 | 4.25 |
| Case 2 | 4.50 | 100% chances = 5 | 100% chances = 5 | 4.50 |

-continued

| | Real Delay | Measured TOA Distribution Due to Clock Jitter | Assumed Measured TOA | Weighted Averaged Results |
|---|---|---|---|---|
| Case 3 | 4.75 | 75% chances = 5, 25% chances = 6 | 75% chances = 4.5, 25% chances = 5.5 | 4.75 |
| Case 4 | 4.10 | 40% chances = 4, 60% chances = 5 | 40% chances = 3.5, 60% chances = 4.5 | 4.10 |
| Case 5 | 4.85 | 65% chances = 5, 35% chances = 6 | 65% chances = 4.5, 35% chances = 5.5 | 4.85 |

However, in practice, it is only possible to average over a limited number of samples. The TOA errors using different numbers of averaging times are shown in FIG. 5 in which the estimated error is plotted against the actual time of arrival for varying averaging times, for the above-described uniform jitter distribution situation. It may be seen that even for averaging over 100 averaging times, the TOA error is greatly reduced (from $0.5t_s$ to $0.06t_s$).

In practice, however, the natural clock jitter distribution is mostly Gaussian instead of being a uniform distribution. Nevertheless, simulations show that, even in this case, if the equivalent summed clock jitter is distributed with a variance $\sigma=t_s/2$, the averaged TOA estimation error may still be greatly reduced in this preferred embodiment of the present invention.

However, if the jitter variance is, for example, $\sigma=10t_s$, the 100 times averaging results may not evidently improve, but, in such an instance, if more averaging times are used, for example 1000 times, the TOA estimation errors may still have large improvements over conventional systems and methods.

An implicit assumption in the above analysis and simulation is that, during the averaging time, the relative clock jitter should be varying enough in the assumed distributing range, that is, the clock jitter should be ergodic when viewed over a short time period. If, during the averaging interval, the clock jitter is concentrated within a small region of its distribution interval, the averaging results may not be efficient. Therefore it is important to design or select clock oscillators that will have an appropriate jitter distribution interval as well as having ample variation over short time periods. Under these conditions, there is no need for any change to be made in the circuit of the time measuring stage 10 to implement one or more preferred embodiments of the invention and, by averaging a large number of measurements, a very high range accuracy may be achieved even with a low sampling rate.

In some systems such as an UWB based ranging system, a large number of range measurements may be obtained in a short time due to the high pulse repetition frequency (PRF). In conventional systems, a very high analogue-to-digital (AD) sampling rate is required to estimate the leading edge of the short impulse waveform. However, the above method may be used to reduce the sampling rate of the analogue-to-digital converter and to reduce the requirement for the resolution of the analogue-to-digital converter as only 1-bit AD conversion is used in the TOA estimation. Therefore, embodiments of the present invention may greatly simplify the circuit design.

Another TOA estimating error in a simple ranging system is related to the target range. In determining the leading edge of a waveform, a single threshold (1-bit AD conversion) may be used to find the edge crossing time as shown in FIG. 6(a) which shows an ideal case in which the signal has infinite bandwidth, and therefore the leading edge rise time will be 0, regardless of the amplitude of the signal pulse. If the threshold is selected to be low enough, the leading edge will cross the threshold at the same time. However, any practical system will be band limited, thus the leading edge cannot rise abruptly. It is known that the rise time is about: $t_r=0.35/B$ where B is the bandwidth. This situation is shown in FIG. 6(b) for two different amplitude signals in a practical system. In this case, the threshold crossing time of the two signals will be different with a time difference $t_d$. The smaller the signal's amplitude, the greater the time difference $t_d$.

It is generally known that the farther away the target is from the receiver, the lower the received signal amplitude will be. Therefore, a more distant target will have a relative measurement error $t_d$ compared with a nearer, high amplitude target. If the signal is transmitted from the target, the amplitude of its direct path signal arriving at the receiver will vary with range, r, as $1/r^2$. Using this relationship and the rise time-bandwidth relationship, a simple range scaling may be used to compensate this near-far target measurement error. Assuming constant amplifier gain is used for all range signals and that the measured range using fixed threshold is $r_{meas}$, the true range $r_{real}$ may be estimated as:

$$r_{real} = \frac{r_{meas}}{1+k_m}; \text{ where } k_m = \frac{cV_{sh}}{2.5BV_{ref}r_{ref}} \quad (1)$$

where $V_{sh}$ is the level of threshold and $V_{ref}$ and $r_{ref}$ are the amplitude and range of the signal for a specific reference range respectively. It may be seen that the greater the range, the greater the absolute range correction value. The correction is therefore a constant $1/(1+K_M)$. In practice, the value of $k_m$ may also be found by experiment.

This near-far range problem may also be solved in a number of other ways. One example is the sensitivity-time control (STC) as used in radar systems in which the gain of the amplifier increases as the time of arrival increases. Alternatively, the detecting threshold may be decreased as the range increases. However, these methods will make the circuitry more complex whereas the method proposed by equation (1) may be implemented very easily.

Figure 7:
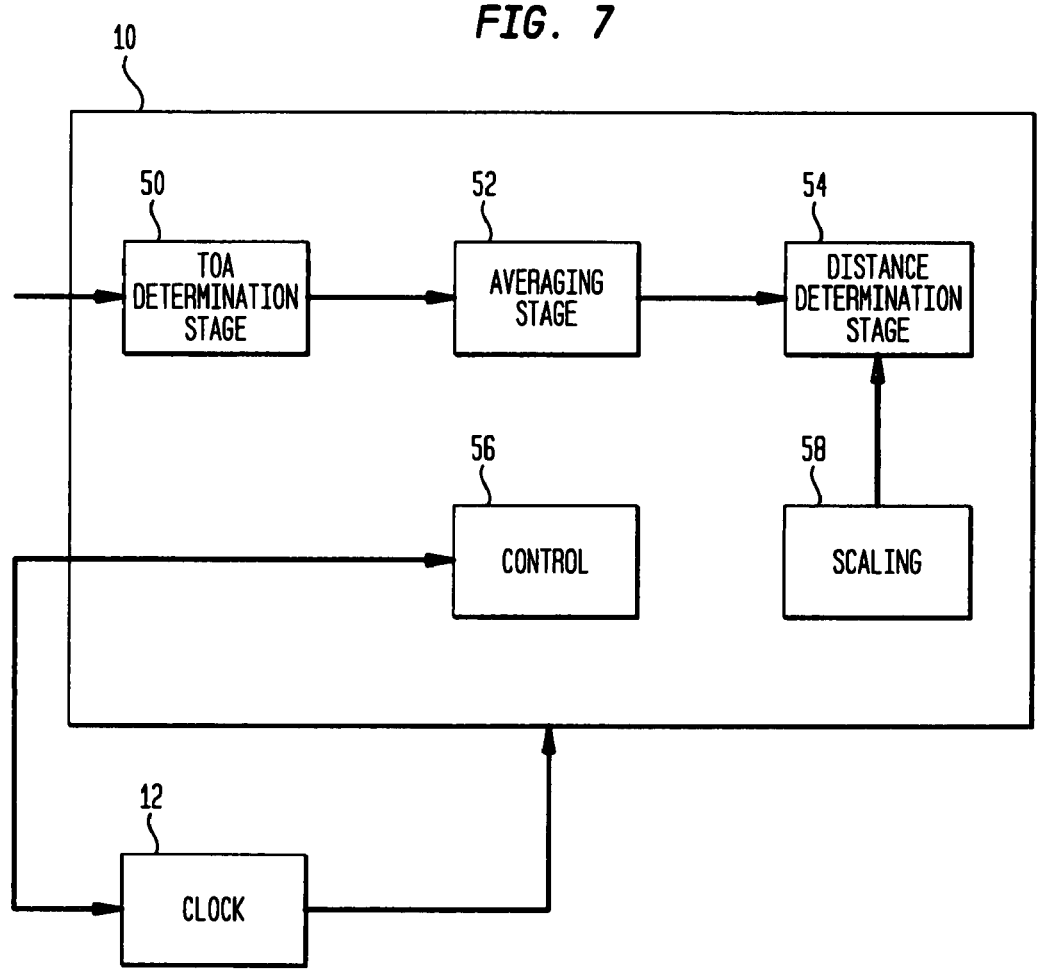
FIG. 7 is a block diagram of a measurement section of an apparatus according to a preferred embodiment.

FIG. 7 is a block diagram of the measurement stage 10 of an apparatus for operating according to one or more preferred embodiments of the present invention. The measurement stage 10 includes a TOA determination stage 50, an averaging stage 52 and a distance determination stage 54 for determining the distance between a target and the receiver.

The transmitter 3 of the system shown in FIG. 1 transmits a first pulse at a first time determined by the sampling clock 12 of FIG. 1, and the receiver 1 is arranged to receive the first pulse. The measurement stage 10 shown in FIG. 7 is within the receiver section 1 which further includes the sampling clock 12 and the sampling stage 8 for sampling the received first pulse at a predetermined amplitude threshold using the sampling clock 12, as shown in FIG. 1.

In operation, the TOA determination stage 50 is arranged to determine the time of arrival of the received first pulse in terms of a number of periods of the sampling clock 12 after the first pulse was transmitted. The transmitter 3 is arranged to transmit a second pulse at a second time determined by the sampling clock 12 and the receiver 1 is arranged to receive the second pulse. The sampling stage 8 is arranged to sample the received second pulse at a predetermined amplitude threshold using the sampling clock 12. The TOA determination stage 50 is arranged to determine the time of arrival of the received second pulse in terms of a number of periods of the sampling clock 12 after the second pulse was transmitted. The averaging stage 52 is arranged to determine the average times of arrival of the first and second pulses to obtain an averaged estimated time of arrival, and the distance determination stage 54 is arranged to determine the distance between the target and the receiver 1 by multiplying the averaged estimated time of arrival by the speed of propagation of the transmitted pulses.

In a preferred embodiment, the TOA determination stage 50 is arranged to average the time of arrival of a predetermined number of pulses.

In accordance with the preferred embodiment illustrated in FIG. 3(a) the transmitter 3 of FIG. 1 is arranged to transmit the first pulse coincident with a sampling clock pulse generated by the sampling clock 12, and is arranged to transmit the second pulse at a time corresponding to half a sampling clock period prior to a predetermined sampling clock pulse.

Figure 4B:
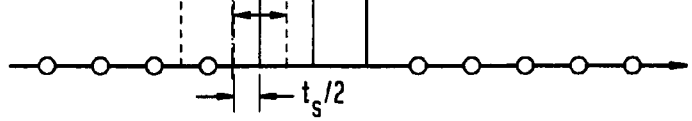
FIG. 4(b) is a timing diagram showing the equivalent clock sampling time distribution due to clock jitter around its nominal time.

A further control stage 56 may preferably be included in the apparatus, as shown in FIG. 7, which controls (controlling including selecting) the jitter of the sampling clock 12 to vary the time of arrival of one or more pulses as measured by the sampling clock, as described in the embodiment of, for example, FIGS. 4(a) and 4(b).

In addition, a scaling stage 58 may preferably also be included for scaling the determined distance by a scaling factor to allow for amplitude variation in the received signal over distance and provide a corrected distance measurement according to equation 1 described above.

In summary, one or more embodiments of the present invention may reduce the maximum TOA error by around fifty percent. In the preferred embodiment which uses controllable clock jitter distribution and averaging of multiple measurements, the TOA error may be significantly reduced and such a system and method is very simple to implement.

Range measurement errors due to the reduction in signal amplitude with range in a bandwidth limited system may be corrected by applying a range scaling factor.

Thus, one or more preferred embodiments of the invention provide a low complexity, high accuracy means for measuring the distance between a target and a receiver in a ranging system at low cost and with low power consumption.

Various modifications to the embodiments of the present invention described above may be made. For example, other components and method steps can be added or substituted for those above. Thus, although the invention has been described above using particular embodiments, many variations are possible within the scope of the claims, as will be clear to the skilled reader, without departing from the scope of the invention.

The invention claimed is:

1. A method of measuring distance between a target and a receiver in a ranging system, the method comprising:
   transmitting a first pulse at a first time determined by a sampling clock in the receiver;
   receiving the first pulse;
   sampling the received first pulse at a predetermined amplitude threshold using the sampling clock;
   determining a time of arrival of the received first pulse in terms of a number of periods of the sampling clock after the first pulse was transmitted;
   transmitting a second pulse at a second time determined by the sampling clock;
   receiving the second pulse;
   sampling the received second pulse at a predetermined amplitude threshold using the sampling clock;
   determining a time of arrival of the received second pulse in terms of a number of periods of the sampling clock after the second pulse was transmitted;
   controlling a jitter of the sampling clock such that the jitter is distributed over a predetermined interval and such that the jitter has a predetermined amount of variation within the predetermined interval in short periods of time so as to vary the time of arrival of one or more pulses as measured by the sampling clock;
   determining an average time of arrival of the first and second pulses to obtain an averaged estimated time of arrival; and
   determining the distance between the target and the receiver by multiplying the averaged estimated time of arrival by a speed of propagation of the transmitted pulses.

2. A method according to claim 1, further comprising repeating the steps for a predetermined number of pulses; wherein the step of determining the averaged time of arrival comprises determining the averaged time of arrival for the predetermined number of pulses.

3. A method according to claim 1, wherein the step of determining the averaged time of arrival comprises averaging the times of arrival of a predetermined number of pulses.

4. A method of measuring distance between a target and a receiver in a ranging system, the method comprising:
   transmitting a first pulse at a first time determined by a sampling clock in the receiver;
   receiving the first pulse;
   sampling the received first pulse at a predetermined amplitude threshold using the sampling clock;
   determining a time of arrival of the received first pulse in terms of a number of periods of the sampling clock after the first pulse was transmitted;
   transmitting a second pulse at a second time determined by the sampling clock;
   receiving the second pulse;
   sampling the received second pulse at a predetermined amplitude threshold using the sampling clock;
   determining a time of arrival of the received second pulse in terms of a number of periods of the sampling clock after the second pulse was transmitted;
   determining an average time of arrival of the first and second pulses to obtain an averaged estimated time of arrival;
   determining the distance between the target and the receiver by multiplying the averaged estimated time of arrival by a speed of propagation of the transmitted pulses; and
   scaling the determined distance by a scaling factor to allow for amplitude variation in the received signal over distance and provide a corrected distance measurement according to the equation:

$$r_{real} = \frac{r_{meas}}{1 + k_m}; \text{ where } k_m = \frac{cV_{sh}}{2.5BV_{ref}r_{ref}}$$

and where $r_{real}$ is the corrected distance measurement, $r_{meas}$ is the determined distance, c is a constant $V_{sh}$ is a predetermined threshold voltage, $V_{ref}$ is a voltage amplitude of the received pulses at a predetermined distance, $r_{ref}$ is the predetermined distance, and B is the bandwidth of the receiver.

5. An apparatus for measuring distance between two objects, the apparatus comprising:
- a transmitter for transmitting a first pulse at a first time determined by a sampling clock;
- a receiver for receiving the first pulse, the receiver including the sampling clock;
- a sampling stage for sampling the received first pulse at a predetermined amplitude threshold using the sampling clock;
- means for determining a time of arrival of the received first pulse in terms of a number of periods of the sampling clock after the first pulse was transmitted;
- the transmitter being arranged to transmit a second pulse at a second time determined by the sampling clock;
- the receiver being arranged to receive the second pulse;
- the sampling stage being arranged to sample the received second pulse at a predetermined amplitude threshold using the sampling clock;
- the means for determining being arranged to determine a time of arrival of the received second pulse in terms of a number of periods of the sampling clock after the second pulse was transmitted;
- the apparatus further comprising:
- a controller to control a jitter of the sampling clock such that the jitter is distributed over a predetermined interval and such that the jitter has a predetermined amount of variation within the predetermined interval in short periods of time so as to vary the time of arrival of one or more pulses as measured by the sampling clock;
- an averaging stage arranged to determine an average time of arrival of the first and second pulses to obtain an averaged estimated time of arrival; and
- a distance determination stage for determining the distance between a target and the receiver by multiplying the averaged estimated time of arrival by a speed of propagation of the transmitted pulses.

6. An apparatus according to claim 5, wherein the means for averaging is arranged to average the time of arrival of a predetermined number of pulses.

7. An apparatus according to claim 5, wherein the means for averaging is arranged to average the times of arrival of a predetermined number of pulses.

8. An apparatus for measuring distance between two objects, the apparatus comprising:
- a transmitter for transmitting a first pulse at a first time determined by a sampling clock;
- a receiver for receiving the first pulse, the receiver including the sampling clock;
- a sampling stage for sampling the received first pulse at a predetermined amplitude threshold using the sampling clock;
- means for determining a time of arrival of the received first pulse in terms of a number of periods of the sampling clock after the first pulse was transmitted;
- the transmitter being arranged to transmit a second pulse at a second time determined by the sampling clock;
- the receiver being arranged to receive the second pulse;
- the sampling stage being arranged to sample the received second pulse at a predetermined amplitude threshold using the sampling clock;
- the means for determining being arranged to determine a time of arrival of the received second pulse in terms of a number of periods of the sampling clock after the second pulse was transmitted;
- the apparatus further comprising:
- an averaging stage arranged to determine an average time of arrival of the first and second pulses to obtain an averaged estimated time of arrival;
- a distance determination stage for determining the distance between a target and the receiver by multiplying the averaged estimated time of arrival by a speed of propagation of the transmitted pulses; and
- a scaling stage for scaling the determined distance by a scaling factor to allow for amplitude variation in the received signal over distance and provide a corrected distance measurement according to the equation:

$$r_{real} = \frac{r_{meas}}{1 + k_m}; \text{ where } k_m = \frac{cV_{sh}}{2.5BV_{ref}r_{ref}}$$

and where $r_{real}$ is the corrected distance measurement, $r_{meas}$ is the determined distance, c is a constant, $V_{sh}$ is a predetermined threshold voltage, $V_{ref}$ is a voltage amplitude of the received pulses at a predetermined distance, $r_{ref}$ is the predetermined distance, and B is the bandwidth of the receiver.

* * * * *